US012757296B2

(12) United States Patent
Carter et al.

(10) Patent No.: US 12,757,296 B2
(45) Date of Patent: Oct. 6, 2026

(54) HEATED MAT

(71) Applicant: Carter Associates, Inc., Burr Oak, MI (US)

(72) Inventors: Alan T. Carter, Sturgis, MI (US); Mark Kollasch, Silver Spring, MD (US)

(73) Assignee: Carter Associates, Inc., Burr Oak, ND (US)

( * ) Notice: Subject to any disclaimer, the term of this patent is extended or adjusted under 35 U.S.C. 154(b) by 808 days.

(21) Appl. No.: 18/189,643

(22) Filed: Mar. 24, 2023

(65) Prior Publication Data

US 2023/0309199 A1 Sep. 28, 2023

Related U.S. Application Data

(60) Provisional application No. 63/323,740, filed on Mar. 25, 2022.

(51) Int. Cl.
*H05B 3/36* (2006.01)
*H05B 3/14* (2006.01)

(52) U.S. Cl.
CPC ............... *H05B 3/36* (2013.01); *H05B 3/145* (2013.01); *H05B 2214/04* (2013.01)

(58) Field of Classification Search
CPC ........ H05B 3/36; H05B 3/145; A01K 1/0158; A01K 1/0157
See application file for complete search history.

(56) References Cited

U.S. PATENT DOCUMENTS

| | | | | |
|---|---|---|---|---|
| 5,451,747 | A * | 9/1995 | Sullivan | A61F 7/007 219/505 |
| 2015/0021313 | A1* | 1/2015 | Chang | H05B 3/34 219/528 |
| 2020/0281046 | A1* | 9/2020 | Beuckelaere | H05B 3/36 |
| 2020/0370762 | A1* | 11/2020 | Zhang | F24D 13/024 |
| 2021/0120777 | A1* | 4/2021 | Gustafson | A01K 1/0353 |

FOREIGN PATENT DOCUMENTS

CN 215453297 U * 1/2022

OTHER PUBLICATIONS

"Potting Compounds—A Guide to Essentials"—RECOM (Year: 2020).*

Innovative Heating Technologies, Hog Hearth® Put the Heat Where the Hogs Are Brochure, retrieved Apr. 19, 2023, from URL https://hoghearth.com/hog-hearth-products/, Oak Bluff, MB Canada, describing systems available prior to 2021 (2 pages).

Osborne Stanfield® Heat Pads Catalog, retrieved Apr. 19, 2023, from URL https://osbornelivestockequipment.com/literature/stanfield-pig-heating-pad-catalog.pdf, Osborne, Kansas, US, describing systems available prior to 2021 (8 pages).

(Continued)

*Primary Examiner* — Thomas E Lazo
(74) *Attorney, Agent, or Firm* — FLYNN THIEL, P.C.

(57) ABSTRACT

A heated mat comprising a bottom protection layer, a middle heated layer, a top layer having a heated surface, and a power cord for supplying power to the middle heated layer. A periphery of the top layer is heated and pressurized against a periphery of the bottom protection layer to sandwich the middle heated layer therebetween in a waterproof manner.

11 Claims, 7 Drawing Sheets

(56) References Cited

OTHER PUBLICATIONS

Kane Manufacturing Company, Inc. screen capture retrieved Apr. 19, 2023, from URL https://www.kanemfg.com/product/baby-pig-heat-mat-double-36/, Des Moines, IA, US, describing systems available prior to 2021 (1 page).
"The New Technology for Radiant Heat" Internet printout (using the WayBack Machine) from https://radiantpaneltechnologies.com/products/graphene-heat-film/ dated Aug. 6, 2020, describing systems available prior to 2021 (1 page).

* cited by examiner

HEATED MAT

CROSS REFERENCE TO RELATED APPLICATION

This claims the benefit of U.S. Provisional Application Ser. No. 63/323,740, filed Mar. 25, 2022, the disclosure of which is hereby incorporated by reference in its entirety.

FIELD OF THE INVENTION

The present invention relates to a mat, and in particular to a heated mat.

BACKGROUND OF THE INVENTION

Heated mats for heating surfaces are desired.

SUMMARY OF THE INVENTION

The present invention, according to one aspect, is directed to a heated mat comprising a bottom protection layer, a middle heated layer, a top layer having a heated surface, and a power cord for supplying power to the middle heated layer. A periphery of the top layer is heated and pressurized against a periphery of the bottom protection layer to sandwich the middle heated layer therebetween in a waterproof manner.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

The specific devices and processes illustrated in the attached drawings and described in the following specification are simply exemplary embodiments of the inventive concepts. Hence, specific dimensions and other physical characteristics relating to the embodiments disclosed herein are not to be considered as limiting.

DETAILED DESCRIPTION

For purposes of description herein, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined herein. Hence, specific dimensions and other physical characteristics relating to the embodiments disclosed herein are not to be considered as limiting, unless expressly stated otherwise.

Figure 1:
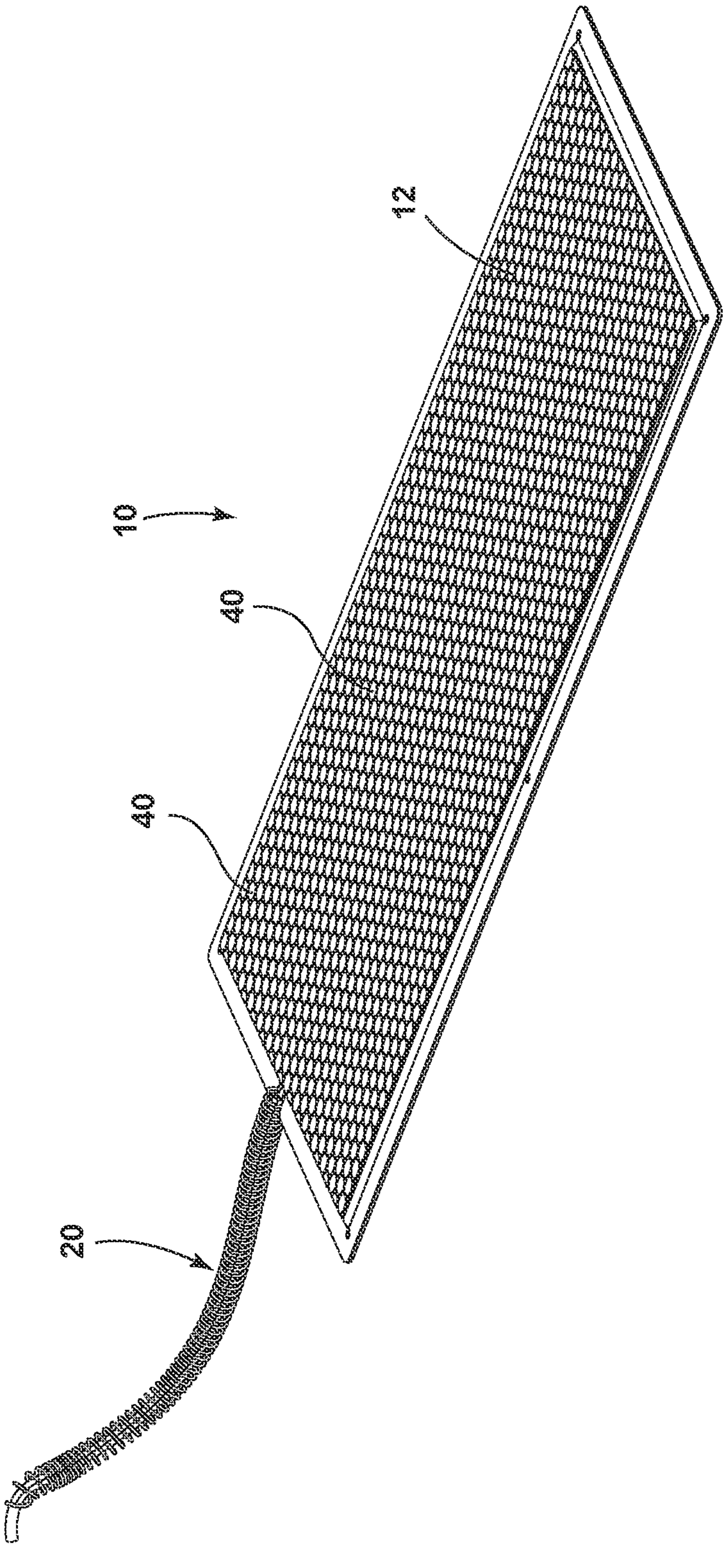
FIG. 1 is a perspective view of a heated mat of the present invention.

The reference number 10 (FIGS. 1-2) generally designates a heated mat of the present invention. The heated mat 10 is configured to provide a heated surface 12. The heated surface 12 of the heated mat 10 can provide a comfortable surface for people and/or animals to stand or sit upon. It is contemplated that the heated surface 12 of the heated mat 10 could be heated up to a temperature of 110° F. without any localized hot spots (i.e., a uniform temperature across the entire heated surface 12). Moreover, it is contemplated that the heated mat 10 can be powered by 1 amp.

In the illustrated example, the heated mat 10 includes a bottom protection layer 14, a middle heated layer 16 and a top layer 18 having the heated surface 12 thereon. A power cord 20 extends from the heated mat 10 and is configured to supply power to the heated mat 10 to heat the middle heated layer 16, thereby providing heat to the top layer 18 at the heated surface 12. The power cord 20 can be directly plugged into or connected to a power source or could be connected to a multiple mat power source that connects to a plurality of heated mats 10 to heat the plurality of heated mats 10.

Figure 2:
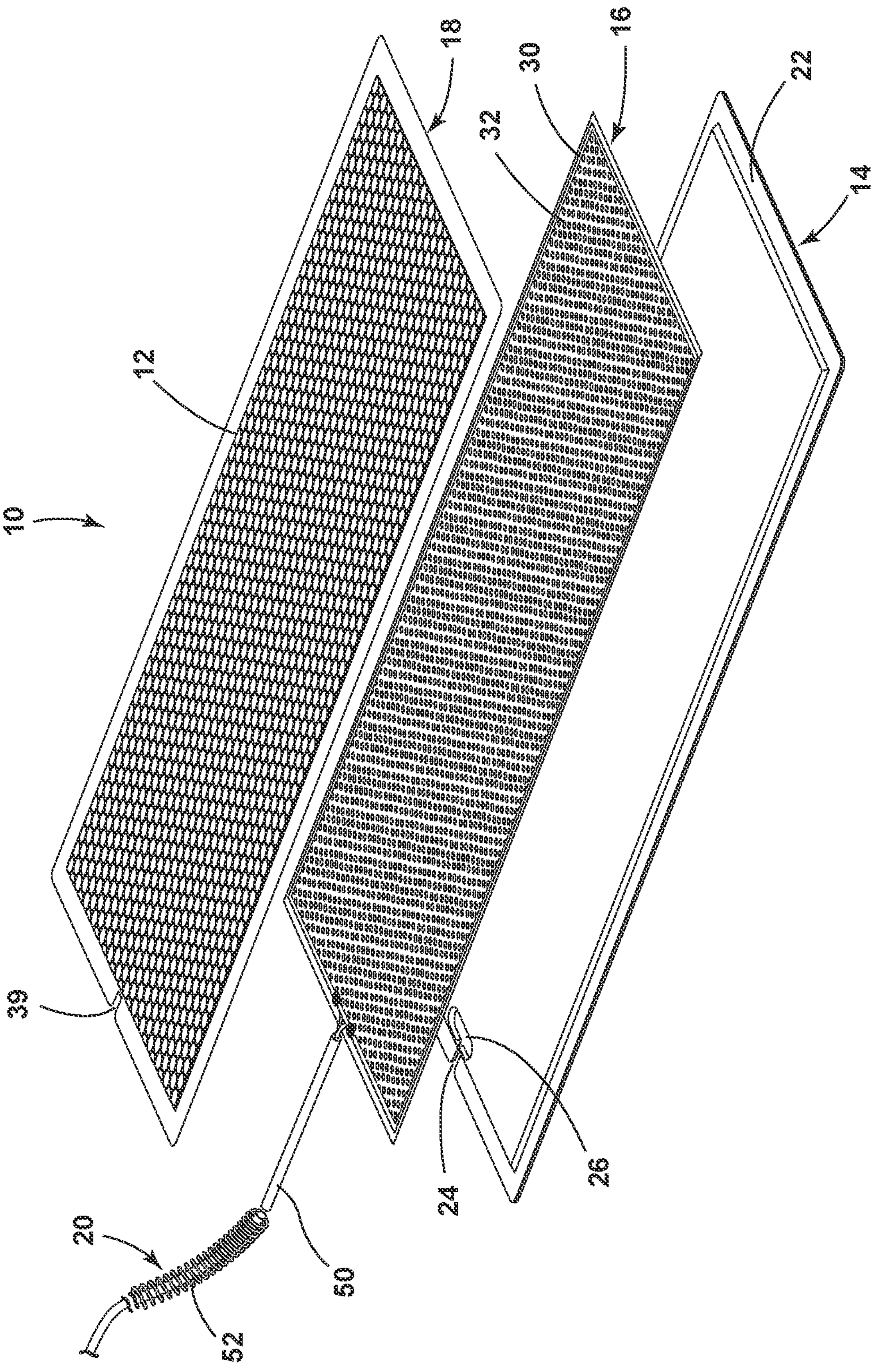
FIG. 2 is an exploded perspective view of the heated mat of the present invention.
Figure 3:
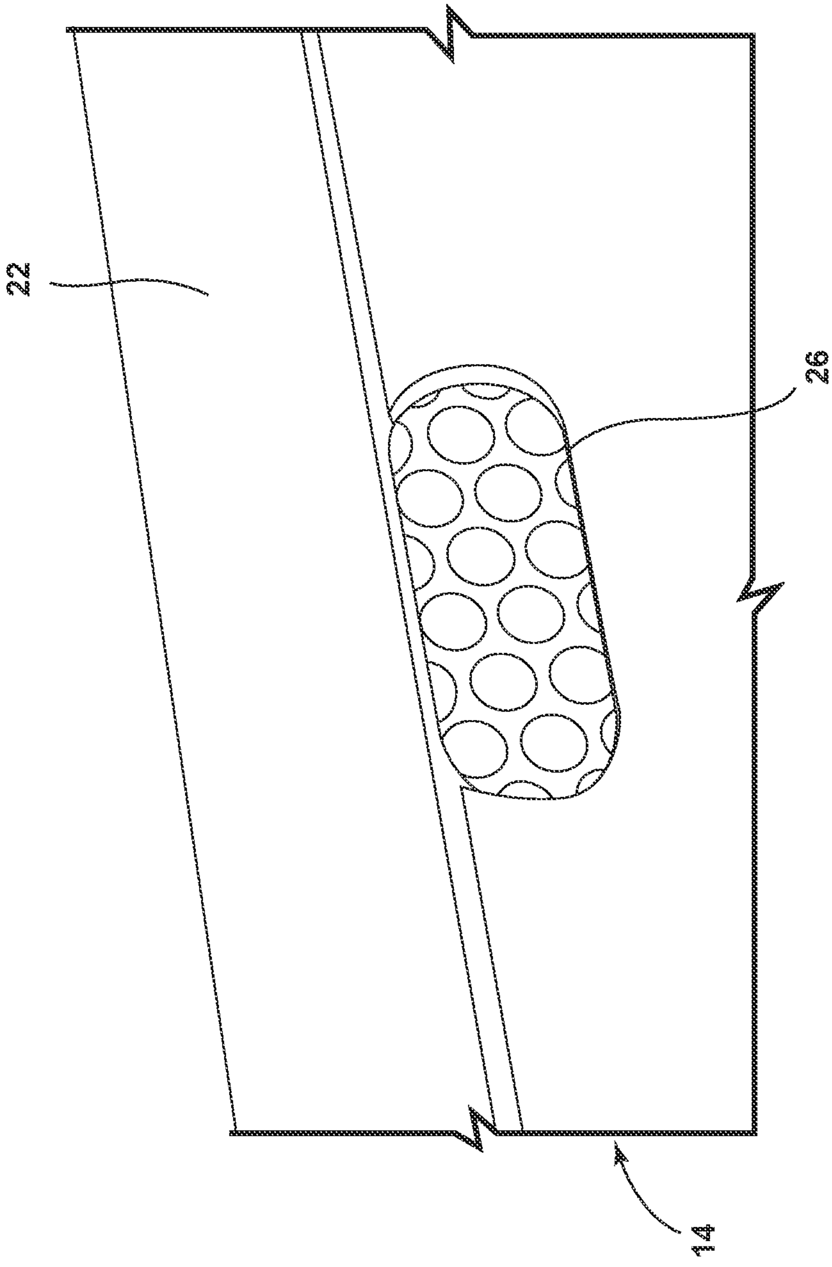
FIG. 3 is a partial side view of a bottom layer of the heated mat of the present invention.

The illustrated bottom protection layer 14 of the heated mat 10 is configured to be placed on a support surface (e.g., a floor). The bottom protection layer 14 can be made from any material that provides support and protection for the remaining layers of the heated mat 10. In the illustrated example, the bottom protection layer 14 is formed from 9 mm PP 2000 gsm cellular board. Therefore, in the illustrated example, the bottom protection layer 14 is formed from polypropylene into cells having 2000 grams per square meter and being 9 mm thick. As shown in FIG. 2, the periphery of the bottom protection layer 14 comprises a flat lip 22 thinner than the rest of the bottom protection layer 14 and not formed into a cellular area. A channel 24 leads into a recess 26 at one edge of the rest of the bottom protection layer 14 as shown in FIGS. 2 and 3. The channel 24 and the recess 26 provide clearance for a power source to connect to the middle heated layer 16.

Figure 4:
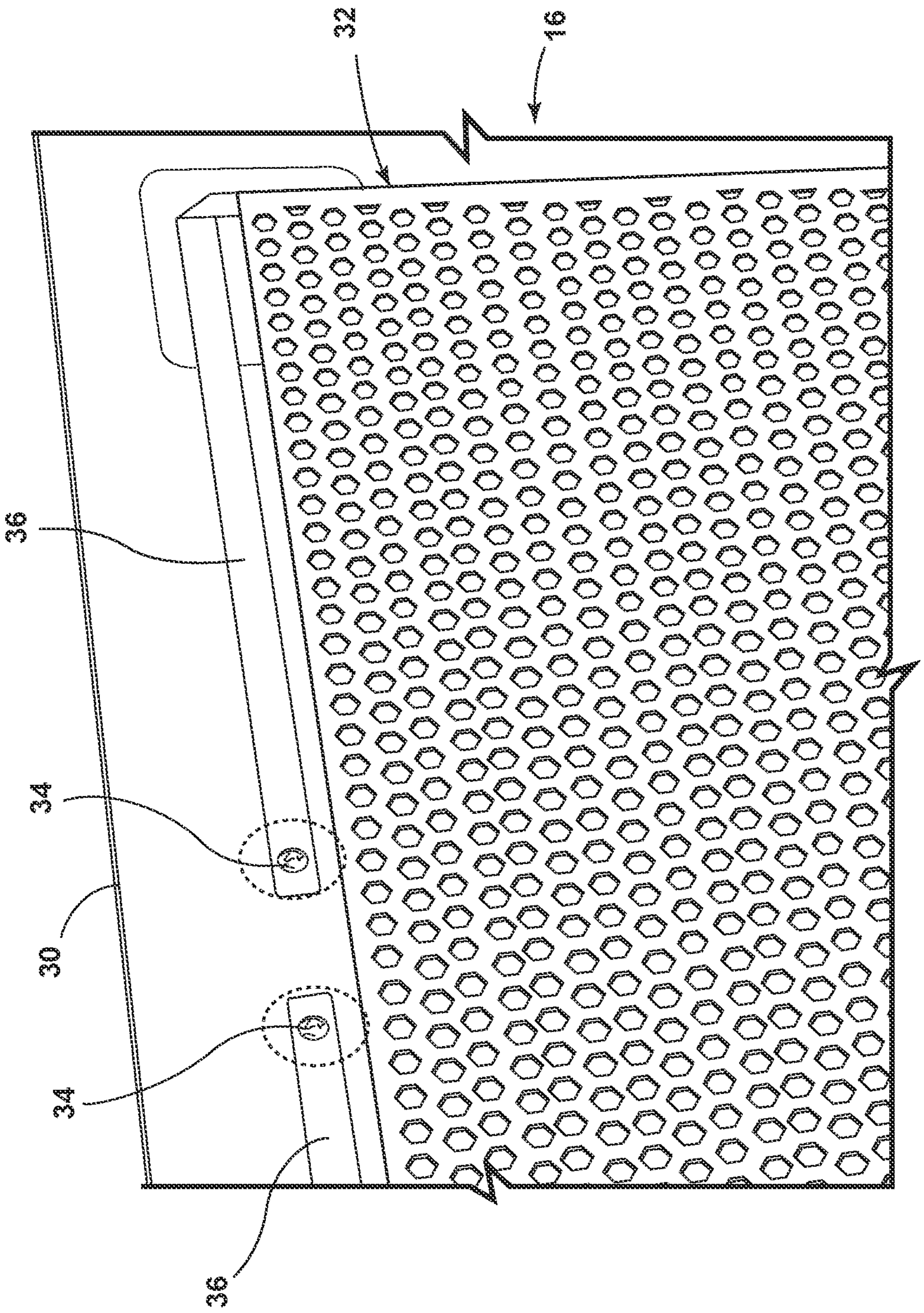
FIG. 4 is a partial side view of a middle layer of the heated mat of the present invention.

In the illustrated example, the middle heated layer 16 is heated to heat the heated mat 10. The middle heated layer 16 comprises a substrate 30 having a heatable material 32 printed thereon. In the illustrated example, the heatable material 32 printed on the substrate 30 is graphene. The graphene of the heatable material 32 is printed across the substrate 30 with a plurality of voids as shown in FIGS. 2 and 4. As shown in FIG. 4, the substrate 30 includes a plurality of metal connectors 34 and a ribbon leads 36 extending from the metal connectors 34 to the heatable material 32. The metal connectors 34, the ribbon leads 36, and the heatable material 32 are configured to form a circuit with the power cord 20. When the circuit is formed and power conducted therethrough, the heatable material 32 will raise in temperature, thereby heating the heated surface 12. The middle heated layer 16 is sold by Radiant Panel Technologies, LLC of Cheyenne, Wyoming under the name GRAPHENE HEAT FILM. The metal connectors 34 will rest within the recess 26 in the bottom protection layer 14 so as to not cause any protrusions on the top of the heated mat 10.

The illustrated top layer 18 rests on the bottom protection layer 14 and the middle heated layer 16 and includes the heated surface 12. The top layer 18 can be any layer that transfers heat from the heatable material 32 of the middle heated layer 16 to the heated surface 12. It is contemplated that the top layer 18 can be elastic. In the illustrated example, the top layer 18 can be a TPO (thermoplastic polyolefin) layer having a spun polyester (fleece) backing that is mechanically attached to the TPO layer during an extrusion manufacturing process. The top layer 18 can be referred to as nickel or coin flooring, which means that the top layer 18 can have raised circular projections 40 for extra grip. If the top layer 18 has raised projections 40, the heated surface 12 can be the top of the raised projections 40. The top layer 18 can include a channel 39 in an edge thereof (see FIG. 2) for accommodating the power cord 20.

The illustrated heated mat 10 can be formed by connecting the power cord 20 to the metal connectors 34 of the middle heated layer 16 and then sandwiching the middle heated layer 16 between the bottom protection layer 14 and the top layer 18. In the process of making the heated mat, the periphery of the top layer 18 is heated and pressurized to the flat lip 22 of the bottom protection layer 14 to seal the middle heated layer 16 therein. The entrance of the power cord 20 into the rest of the heated mat 10 can also be sealed (e.g., in a waterproof manner) to protect the middle heated layer 16.

In the illustrated example, the power cord 20 can be connected to a source of power as outlined above. For example, an end of the power cord 20 could have a three pronged connection for connecting the power cord 20 to a standard outlet. The power cord 20 can be any cord that supplies sufficient power to the heated mat 10. In the illustrated example, the power cord 20 can be an 18/2 SJO wire 50 having a stainless steel spring cord protector 52 covering at least a portion thereof.

Figure 5:
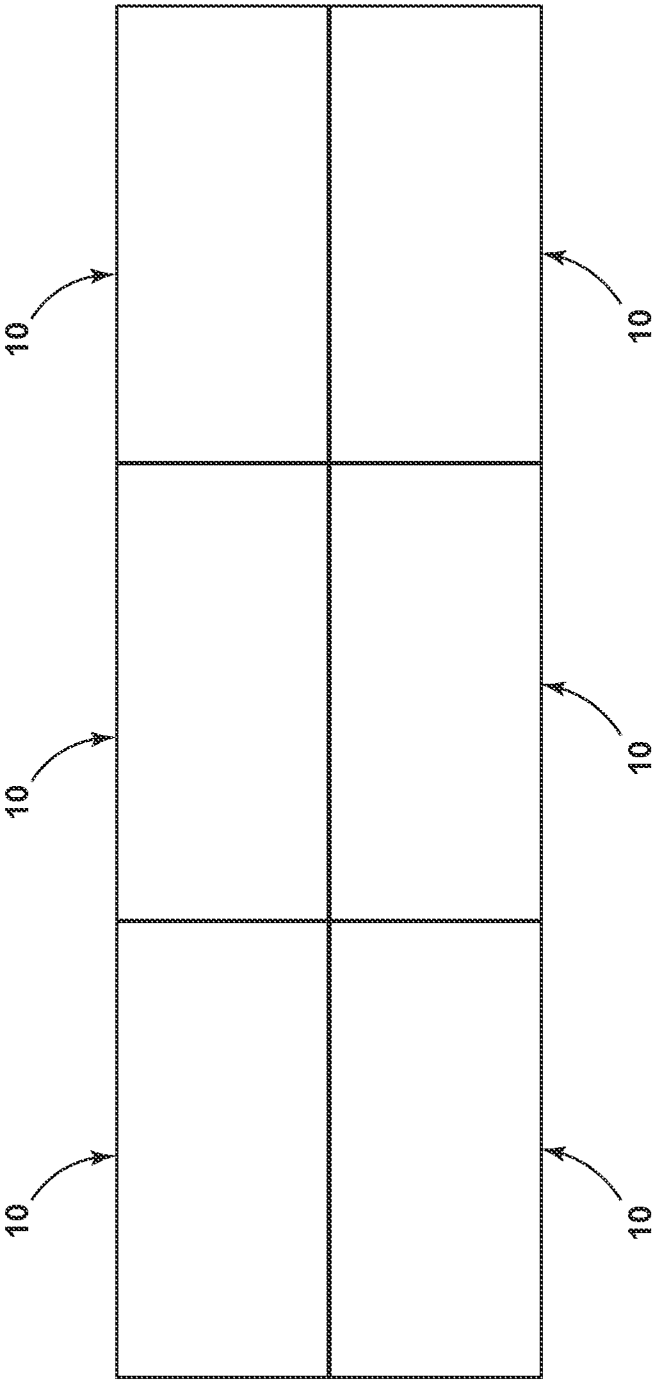
FIG. 5 is a schematic view of several heated mats of the present invention.
Figure 6:
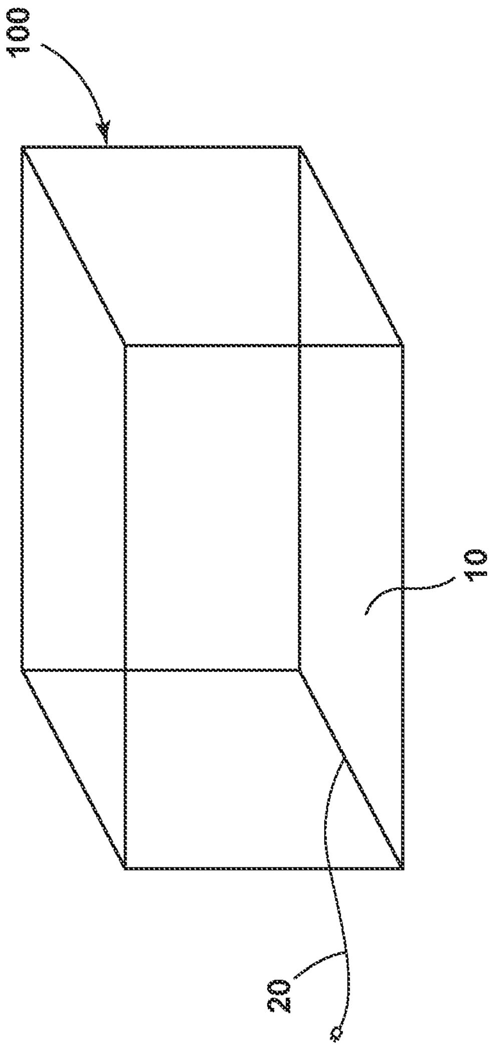
FIG. 6 is a schematic perspective view of a heated mat of the present invention in a cage.

The heated mat 10 can be used in any situation wherein a heated floor is desired. For example, as shown in FIG. 5, a plurality of heated mats 10 can be positioned adjacent to each other to form a large, heated floor. As shown in FIG. 6, the heated mat 10 can be used in a cage 100 housing an animal.

The reference number 10*a* (FIG. 7) generally designates a second embodiment of the heated mat of the present invention. The heated mat 10*a* is similar to and can be used in the same manner as the previously described heated mat 10 (e.g., used in a matrix of heated mats 10*a* like that shown in FIG. 5 and/or used in a cage 100 like that shown in FIG. 6. The heated mat 10*a* includes a heated surface 12*a* that provides a comfortable surface for people and/or animals to stand or sit upon. It is contemplated that the heated surface 12*a* of the heated mat 10*a* could be heated up to a desired temperature (e.g., 60° F.) without any localized hot spots (i.e., a uniform temperature across the entire heated surface 12*a*).

The heated mat 10*a* comprises a laminated structure including a bottom protection layer 14*a*, an insulation layer 60, a heated layer 16*a* and a top layer 18*a* having the heated surface 12*a* thereon. The bottom protection layer 14*a* is made of durable material. For example, the bottom protection layer 14*a* can be formed from thermoplastic polyolefin (TPO) or similar material. The top layer 18*a* can be any layer that transfers heat from the heatable material 32*a* of the heated layer 16*a* to the heated surface 12*a*. It is contemplated that the top layer 18*a* can be elastic. In the illustrated example, the top layer 18*a* can be a TPO (thermoplastic polyolefin) layer having a spun polyester (fleece) backing that is mechanically attached to the TPO layer during an extrusion manufacturing process. The top layer 18*a* can be referred to as nickel or coin flooring, which means that the top layer 18*a* can have raised circular projections 40*a* for extra grip. If the top layer 18*a* has raised projections 40*a*, the heated surface 12 can be the top of the raised projections 40*a*.

In the illustrated example, the insulation layer 60 and the middle heated layer 16 are sandwiched between the top layer 18*a* and the bottom protection layer 14*a*. The insulation layer 60 is positioned on the bottom protection layer 14*a* and provide insulation between the bottom protection layer 14*a* and the heated layer 16*a*. The insulation layer 60 can be formed of any insulating material that is safe to use around animals and humans and does not degrade when heat is applied thereto. For example, the insulation layer 60 can be formed of double reflective insulation. The heated layer 16*a* is configured to heat the heated mat 10*a*. The heated layer 16*a* can be formed from any material that can uniformly heat the heated mat 10*a*. For example, the heated layer 16*a* can comprise a substrate 30*a* having a heatable material 32*a* printed thereon. In the illustrated example, the heatable material 32*a* printed on the substrate 30*a* is graphene.

Figure 7:
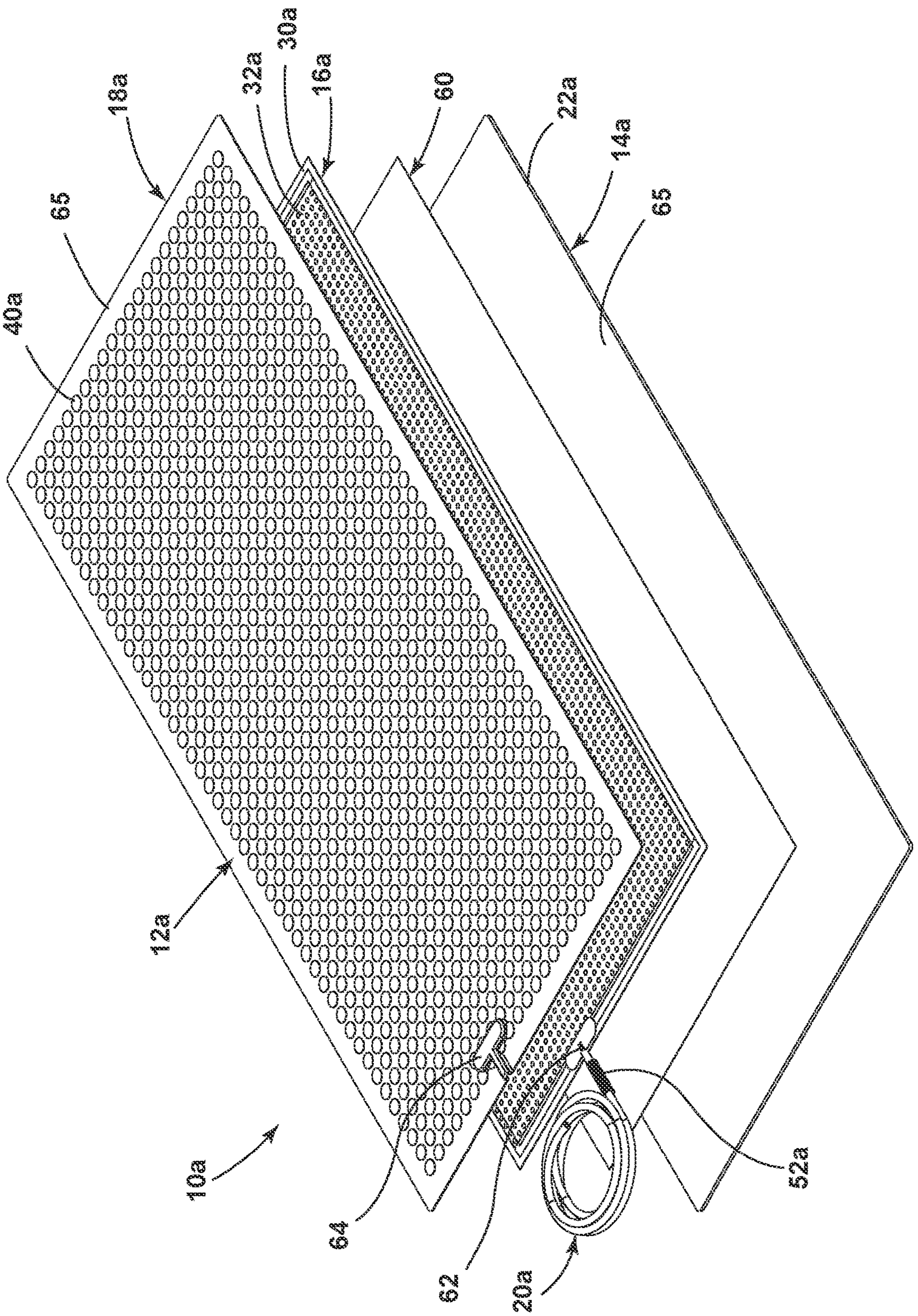
FIG. 7 is a perspective view of a second embodiment of the heated mat of the present invention.

As shown in FIG. 7, the insulation layer 60 and the heated layer 16*a* have a smaller perimeter than the top layer 18*a* and the bottom protection layer 14*a* to allow the insulation layer 60 and the heated layer 16*a* to be encapsulated by the top layer 18*a* and the bottom protection layer 14*a*. The top layer 18*a* and the bottom protection layer 14*a* each have edges 65 that are sealed to each other (e.g., by heat sealing) to encapsulate the insulation layer 60 and the heated layer 16*a* to protect the same from the elements.

A power cord 20*a* extends from the heated mat 10*a* and is configured to supply power to the heated mat 10*a* to heat the heated mat 10*a*, thereby providing heat to the top layer 18*a* at the heated surface 12*a*. The power cord 20*a* can be directly plugged into or connected to a power source or could be connected to a multiple mat power source that connects to a plurality of heated mats 10*a* to heat the plurality of heated mats 10*a*. The power cord 20*a* can include a tension relief stainless steel spring cord protector 52*a* covering at least a portion thereof. The intersection and connection of the power cord 20*a* to the heatable material 32*a* can include a temperature limiter 62 for limiting the temperature of the heatable material 32*a* to a certain temperature (e.g., 60° F.). The top layer 18*a* includes a T-shaped channel 64 configured to seal the intersection of the power cord 20*a* and the heatable material 32*a* to protect the intersection from the elements (e.g., rain, etc.) or other items that are undesirable to enter the heated mat 10*a* (for example, water or animal waste from an animal using the heated mat 10*a*). A potting and encapsulating compound can cover the intersection and be located within the T-shaped channel 64 and sandwiched between the T-shaped channel 64 and a top surface of the substrate 30*a* of the heated layer 16*a*.

The heated mat 10*a* can be constructed in many different ways to result in the structure as disclosed herein. One non-limiting example of constructing the heated mat 10*a* includes the following steps (with the order for most steps not being important):

1. cut the bottom protection layer 14*a* to a desired size;
2. cut the top layer 18*a* to the desired size;
3. cut the insulation layer 60 to the desired size;
4. cut the tension relief stainless steel spring cord protector 52*a* to a desired length;
5. form the T-shaped channel 64 in the top layer 18*a*;
6. connect a first lead of the temperature limiter 62 to the heatable material 32*a* (e.g., by soldering);
7. connect a second lead of the temperature limiter 62 to a first lead of the power cord 20*a* (e.g., by soldering);
8. connect a second lead of the power cord 20*a* to the heatable material 32*a* (e.g., by soldering);

9. apply adhesive to one side of the bottom protection layer 14*a;*
10. apply adhesive to both sides of the heated layer 16*a;*
11. apply adhesive to both sides of the insulation layer 60;
12. apply adhesive to the bottom of the top layer 18*a;*
13. fill the T-shaped channel 64 with potting material;
14. connect the top layer 18*a* to the heated layer 16*a;*
15. connect the insulation layer 60 to the heated layer 16*a;*
16. connect the bottom protection layer 14*a* to the insulation layer 60;
17. press laminated parts of the heated mat 10*a;*
18. heat fuse all four edges 65 of the top layer 18*a* and the bottom protection layer 14*a* to ensure a water tight seal; and
19. install plug (not shown) to end of the power cord 20*a*.

As stated above, the above steps do not have to be carried out in the specific order outlined above. For example, steps 1-4 can occur in any order.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A heated mat comprising:
a bottom protection layer;
a middle heated layer;
a top layer having a heated surface; and
a power cord for supplying power to the middle heated layer;
wherein a periphery of the top layer is heated and pressurized against a periphery of the bottom protection layer to sandwich the middle heated layer therebetween in a waterproof manner.

2. The heated mat of claim 1, wherein:
the middle heated layer comprises graphene.

3. The heated mat of claim 1, further including:
an insulation layer between the bottom protection layer and the middle heated layer.

4. The heated mat of claim 1, wherein:
power is supplied to the middle heated layer through the power cord.

5. The heated mat of claim 4, further including:
a heat limiter for limiting the temperature of the heated mat to a desired temperature.

6. The heated mat of claim 4, wherein:
the heated surface comprises graphene;
the top layer includes a T-shaped channel for allowing the power cord to be connected to the graphene.

7. The heated mat of claim 6, wherein:
a potting and encapsulating compound is located in the T-shaped channel to protect an interior of the heated mat from water reaching the interior of the heated mat.

8. A heated mat comprising:
a bottom protection layer;
a middle substrate having graphene thereon;
a top layer having a heated surface; and
a power cord for supplying power to the graphene;
wherein a periphery of the top layer is sealed to a periphery of the bottom protection layer to encapsulate an interior of the heated mat including the middle substrate therein in a waterproof manner; and
wherein the top layer includes a T-shaped channel for allowing the power cord to be connected to the graphene.

9. The heated mat of claim 8, further including:
an insulation layer between the bottom protection layer and the middle substrate.

10. The heated mat of claim 8, further including:
a heat limiter for limiting the temperature of the heated mat to a desired temperature.

11. The heated mat of claim 8, wherein: a potting and encapsulating compound is located in the T-shaped channel to protect an interior of the heated mat from water reaching the interior of the heated mat.

* * * * *